(12) United States Patent
Makovicka (10) Patent No.: US 6,725,193 B1
(45) Date of Patent: Apr. 20, 2004

(54) CANCELLATION OF LOUDSPEAKER WORDS IN SPEECH RECOGNITION

(75) Inventor: Thomas J. Makovicka, Raleigh, NC (US)

(73) Assignee: Telefonaktiebolaget LM Ericsson (SE)

( * ) Notice: Subject to any disclaimer, the term of this patent is extended or adjusted under 35 U.S.C. 154(b) by 671 days.

(21) Appl. No.: 09/660,651

(22) Filed: Sep. 13, 2000

(51) Int. Cl.$^7$ ................................................ G10L 15/20
(52) U.S. Cl. .................................... 704/233; 704/236
(58) Field of Search ................................ 704/231, 233, 704/234, 251, 270, 270.1, 275, 236

(56) References Cited

U.S. PATENT DOCUMENTS

| | | | | |
|---|---|---|---|---|
| 5,475,791 A | * | 12/1995 | Schalk et al. ............... | 704/233 |
| 5,548,681 A | | 8/1996 | Gleaves et al. | |
| 5,758,318 A | * | 5/1998 | Kojima et al. .............. | 704/251 |
| 5,864,804 A | * | 1/1999 | Kalveram .................... | 704/233 |
| 5,937,379 A | * | 8/1999 | Takagi ........................ | 704/233 |
| 5,978,763 A | * | 11/1999 | Bridges ....................... | 704/233 |
| 6,275,797 B1 | * | 8/2001 | Randic ........................ | 704/233 |
| 6,606,595 B1 | * | 8/2003 | Chengalvarayan et al. . | 704/256 |
| 6,651,043 B2 | * | 11/2003 | Ammicht et al. ........... | 704/275 |
| 6,665,645 B1 | * | 12/2003 | Ibaraki et al. .............. | 704/275 |

FOREIGN PATENT DOCUMENTS

WO     WO 95 05655 A     2/1995

\* cited by examiner

*Primary Examiner*—Richemond Dorvil
*Assistant Examiner*—Martin Lerner
(74) *Attorney, Agent, or Firm*—Coats & Bennett, P.L.L.C.

(57) ABSTRACT

A voice recognition system for use with a communication system having an incoming line carrying an incoming signal from a first end to a second end operably attached to a speaker and the outgoing line carrying an outgoing signal from a microphone near the speaker. A first speech recognition unit (SRU) detects selected incoming words and a second SRU detect outgoing words. A comparator/signal generator compares the outgoing word with the incoming word and outputs the outgoing word when the outgoing word does not match the incoming word. The first SRU may be delayed relative to the second SRU. The SRU's may also search only for selected words in template, or may ignore words which are first detected by the other SRU. A signaler may also provide a signal indicating inclusion of one of the selected words in a known incoming signal with an SRU being responsive to that signal to ignore the included one command word in the template for a selected period of time.

29 Claims, 5 Drawing Sheets

CANCELLATION OF LOUDSPEAKER WORDS IN SPEECH RECOGNITION

BACKGROUND OF THE INVENTION

This invention relates to a method and apparatus for voice telecommunication, and more particularly to a method and apparatus in which incoming voice signals output by a speaker may be canceled from an outgoing voice signal to be used for speech recognition.

In a conventional communication system such as a land-based telephone system, speech spoken into a remote telephone is picked up by a microphone in the telephone and converted into an incoming audio analog signal (relative to the receiving telephone). The incoming audio signal is sent down an incoming line and eventually to an amplifier connected to a speaker in the receiving telephone. The amplifier amplifies the signal and the speaker converts the amplified signal into sound waves that are heard by a person at the receiving telephone. The person can respond by speaking into a microphone in the receiving telephone. The microphone is operably connected to an outgoing line and converts the words of the telephone user into an outgoing audio signal sent down an outgoing line and ultimately onward, generally to a speaker in the remote telephone.

A land based communication system, with speech recognition, typically has a far end and a near end with a remote microphone/speaker unit located at the far end and a local microphone/speaker unit located at the near end. A landline connects the remote and local microphone/speaker units. The landline has an incoming line (relative to the local microphone/speaker unit) that connects the remote microphone with the local speaker; and an outgoing line (relative to the local microphone/speaker unit) that connects the local microphone with the remote speaker. A speech recognition unit is usually operably attached to the outgoing line carrying the outgoing audio signal from the local microphone at the near end to the remote speaker at the far end. Words spoken by a person at the near end, in response to the output from the local speaker, are received by the local microphone and converted into an outgoing audio analog signal that travels along the outgoing line from the local microphone to the remote speaker at the far end. The speech recognition unit converts the outgoing audio analog signal into words. Problems can arise when the local microphone picks up words other than words spoken by the near end person. For example, speech from the local speaker might be picked up by the local microphone along with speech from the near end person, and produce a mixed outgoing audio analog signal containing speech from the near end speaker and the near end person. A speech recognition unit "listening" to the outgoing microphone signal may not differentiate between the two. For example, where a remote system generates an audio command such as "Please type seven to delete message" and that command is output on the near end speaker, the words "seven" and "delete" may well be picked up by the microphone and carried in the outgoing signal which, when received and processed by the speech recognition unit, could cause a message to be deleted even though the near end user did nothing.

An echo suppressor has been operably attached to the incoming and outgoing lines of the communication system to improve the operation of the speech recognition unit. The echo canceller is used to suppress words picked up by the microphone from the loudspeaker. Voice recognition units should only receive words spoken by the near end user and picked up by the microphone, but suppression of the loudspeaker words by means of the echo canceller can leave a residual echo in the outgoing line along with genuine outgoing signal (i.e. words spoken by the user) and result in a mixes outgoing signal. The speech recognition unit might fail to differentiate bet ween the genuine words spoken by the user and unwanted output from the speaker. In this type of scenario, the speech recognition would incorrectly attribute words from the speaker as words spoken by the near end user.

Alternatively, communication systems have been configured to disable the microphone when the loudspeaker is producing output. However, this solution does not allow for a user interrupting or "cutting through" a voice prompt outputted from the speaker. For example, the microphone would not clearly pick up a user's response when the user interrupts a voice prompt such as, "Speak your login ID." The user would have to always remember to wait for each verbal prompt to complete before responding.

SUMMARY OF THE INVENTION

In one aspect of the present invention, a voice recognition system is provided for use with a communication system having an incoming line and an outgoing line, the incoming line carrying an incoming signal from a first end to a second end operably attached to an audio output responsive to the incoming signal and the outgoing line carrying an outgoing signal from a second end to a first end, the outgoing line second end being attached to a microphone near the audio output. The voice recognition system includes a first speech recognition unit for detecting an incoming word in the incoming signal, a second speech recognition unit for detecting an outgoing word in the outgoing signal, and a comparator/signal generator operably connected to the first and the second speech recognition units. The comparator/signal generator compares the outgoing word with the incoming word and outputs the outgoing word when the outgoing word does not match the incoming word.

In other aspects of the invention, the first speech recognition unit may be delayed relative to the second speech recognition unit so as to search for a word in the incoming signal corresponding to the outgoing word detected by the second speech recognition unit during the delay. Further, the speech recognition units may search only for selected words, or may ignore words which are first detected by the other speech recognition unit. The speech recognition units may use templates to search only for selected words, and those templates may be trained by the voice prompt system and/or by the user, either as speaker independent or speaker dependent.

In still another aspect of the invention, a signaler may provide a signal indicating inclusion of one of the command words in the known incoming signal with a speech recognition unit responsive to that signal to ignore the included one command word in the template for a selected period of time, where a signal generator operably connected to speech recognition unit generates commands responsive to detection of one of the selected command words by the speech recognition unit.

BRIEF DESCRIPTION OF THE DRAWINGS

The following is a brief description of the drawings that are presented for the purposes of illustrating the invention and not for purposes of limiting the same.

DETAILED DESCRIPTION OF THE INVENTION

While the invention will be described in connection with one or more embodiments, it should be understood that the invention is not limited to those embodiments. On the contrary, the invention includes all alternatives, modifications, and equivalents as may be included within the spirit and scope of the appended claims.

Figure 1:
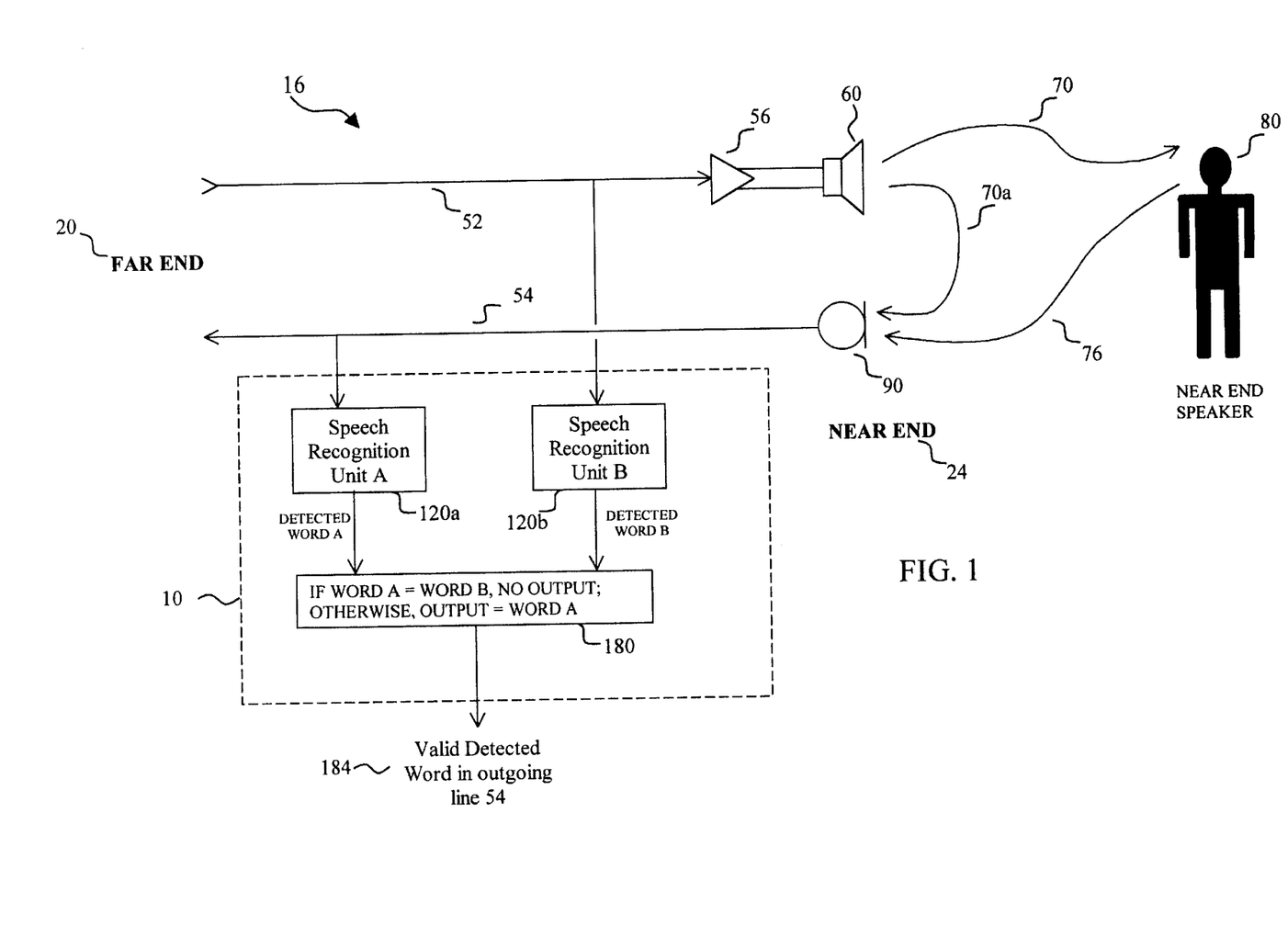
FIG. 1 is a diagram of a speech recognition system in a communication environment, according to one aspect of the present invention.

FIG. 1 is a diagram of a voice or speech recognition system 10 according to one aspect of the present invention used with a communication system 16.

The communication system 16 connects a far end 20 and near end 24. In the convention used herein, the near end user 80, has an incoming signal line 52 and an outgoing signal line 54 for carrying incoming signals from the far end 20 to the near end 24 and outgoing signals from the near end 24 to the far end 20, respectively. It should be recognized that the communication system 16 with which the speech recognition system 10 of the present invention may be used may be any communication system in which audio signals are communicated including, for example, public telephone systems, private office systems, public and private cellular systems (including analog and digital systems), and various combinations thereof. Further, it should be recognized that the speech recognition system 10 of the present invention may be at any physical location where it may communicate with the incoming and outgoing signal lines 52, 54 and, while one acceptable position is at the near end 24, it could also be provided elsewhere in the system.

The incoming signals on the incoming signal line 52 include audio signals which are amplified by an amplifier 56 and then output as an audio sound 70. A microphone 90 is provided on the near end of the outgoing signal line 54 and picks up audio sounds at the near end 24 and converts them to outgoing audio signals for transmission to the far end 20 via the outgoing signal line 54. Specifically, the microphone will pick up not only the speech 76 of a near end user/speaker 80, but will also pick up the audio sounds 70a from the speaker 60.

Turning now to the speech recognition system 10 according to the present invention, speech recognition units A and B (120a and 120b, respectively) are operably connected to the outgoing and incoming lines 54 and 52, respectively. Analog or digital speech signals in the lines 54 and 52 are processed by speech recognition units 120a and 120b, respectively. The speech recognition unit 120a detects a word (represented by "DETECTED WORD A" in FIG. 1) in outgoing signal line 54 and the speech recognition unit 120b detects a word in incoming signal line 52 represented by "DETECTED WORD B" in FIG. 1).

Figure 2:
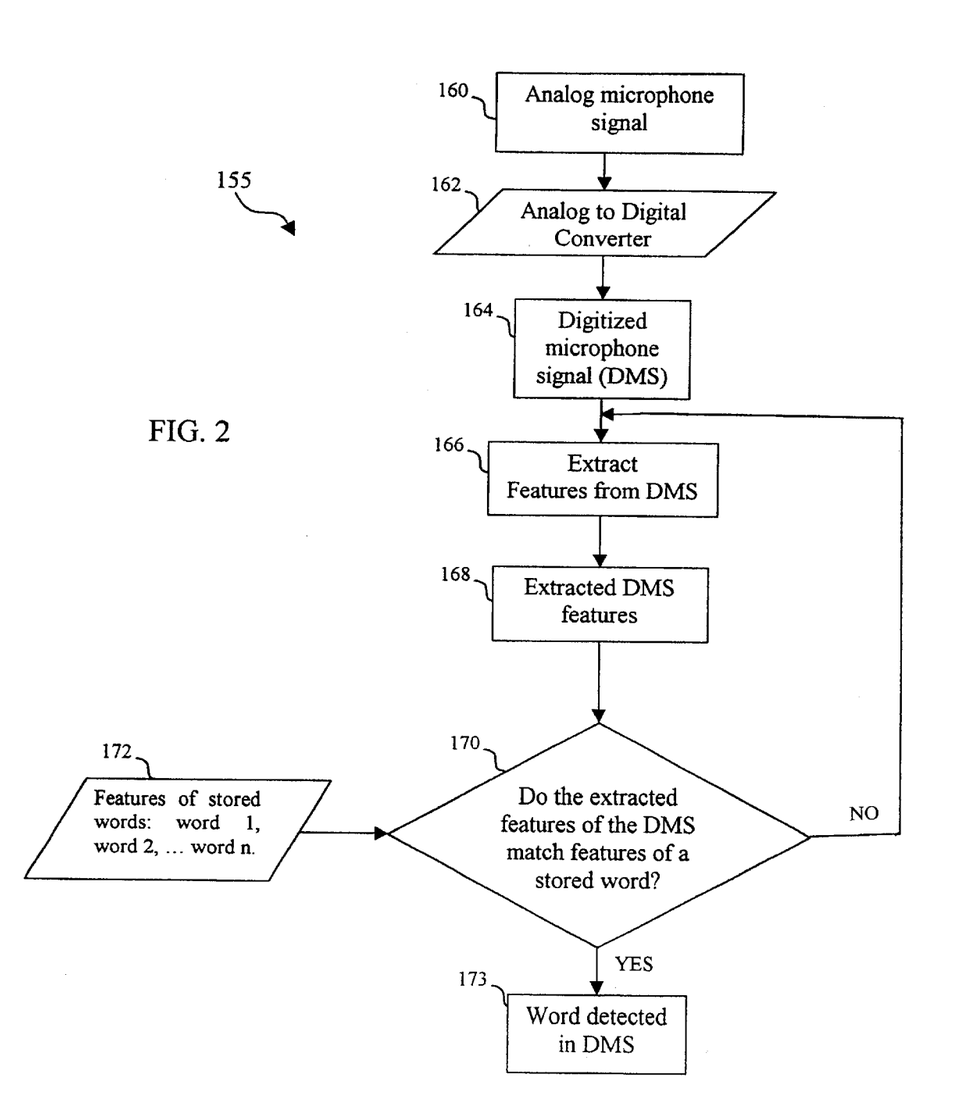
FIG. 2 is a flow chart illustrating one method of speech recognition usable with the present invention.

FIG. 2 illustrates a flow chart 1 55 of one way in which words may be recognized or detected by the speech recognition units 120a, 120b. An analog microphone signal at 160 is input to an analog to digital converter at 162 which converts the signal to a digitized microphone signal (DMS) at 164 (of course, if the present invention is used with a communication system which transmits digital signals, such conversion would be unnecessary). Features used in speech recognition are extracted from the DMS at 166 to produce extracted DMS features at 168. The extracted DMS features generated from the signal are then compared at 170 to the stored features at 170 of the various words which the system 10 is capable of recognizing. If the features do match, the system outputs the word detected in the DMS at 173. It should be understood, however, that this is just one exemplary way in which speech recognition may be accomplished, and that the present invention may be used with any system capable of recognizing words in a communication system. For example, when the incoming audio signal in line 52 is already digitized then an analog to digital converter is not required.

Referring back to FIG. 1, in accordance with one aspect of the invention, a comparator and signal generator 180 compares the DETECTED WORD A against DETECTED WORD B. If DETECTED WORD A does not match DETECTED WORD B, the comparator and signal generator 180 generates a signal, output at 184, that a valid detected word is in outgoing line 54. When DETECTED WORD A matches DETECTED WORD B, no signal is output at 184 to indicate a valid detected word. In this manner, the comparator and signal generator 180 is able to cancel out any feedback received from the speaker audio signal 70a picked up by the microphone 74. This comparison of detected words is done during a selected time period or with a selected delay, since an outgoing word which is sufficiently delayed after a comparable word in the incoming signal (as would typically occur when a near end user/speaker 80 responds to a prompt from the incoming signal line speaker 60) would not be feedback from the speaker 60 and therefore would be properly output.

It should also be understood that the speech recognition unit 120b might fail to detect a word in the incoming line 52 at about the same time the speech unit 120a detects a word in outgoing line 54. In this case, speech unit 120b is said to have detected a null word and the comparator 180 outputs a valid detected word at 184 corresponding to the outgoing word. The terms "no word" and "null word" shall hereafter be regarded as equivalent terms.

In addition, the speech recognition 120a might not detect a word in outgoing line 54 (equivalent to detecting a null word in the outgoing line 54) at about the same time the speech recognition unit 120b detects a word in incoming line 52. In this circumstance, the comparator 180 ignores the word detected by speech recognition unit 120b and no word is outputted at 184.

Table 1 describes the decisions made by the comparator and signal generator 180 of FIG. 1:

TABLE 1

| Scenario | Speech recognition unit 120a detects: | Speech recognition unit 120b detects: | Signal Comparator and signal generator 180 | and output at 184 |
|---|---|---|---|---|
| 1 | Outgoing word A | Incoming word B | A ≠ B | Word A |
| 2 | Outgoing word A | Incoming word B | A = B | No output |
| 3 | Outgoing word A | Null word | A ≠ null word | Word A |

TABLE 1-continued

| Scenario | Speech recognition unit 120a detects: | Speech recognition unit 120b detects: | Signal Comparator signal generator 180 | and output at 184 |
|---|---|---|---|---|
| 4 | Null word | Incoming word B | Null word [1] B | No output |

In accordance with the above, it will be recognized with this aspect of the present invention that, in a communication system 16 which uses a variable system which is responsive to voice commands of a user, the problem of a voice activated action being taken responsive to the feedback of the system's own audio instructions to the user is eliminated. (As used herein, "variable system" is meant to refer to systems which communicate over communication systems and vary their actions responsive to received communications including, for example, voice mail systems which play back voice mail according to the user's commands, data processing systems which transmit information [e.g., stock prices] requested by the user, etc.). Thus, a system which responds to a user's audio command to "delete" something will not inadvertently delete that something in response to its own instructions which are given via the speaker 60 to the user 80.

It should be understood that several of the components described in the context of FIG. 1 may be integrated. For example, the speech recognition units 120b and 120a could be integrated and carried out on a single integrated processor, with references herein and in the appended claims to two different speech recognition units being for convenience of reference and understanding of the user. Likewise, the comparator and signal generator 180 could be integrated with the speech recognition units 120b and 120a.

Figure 3:
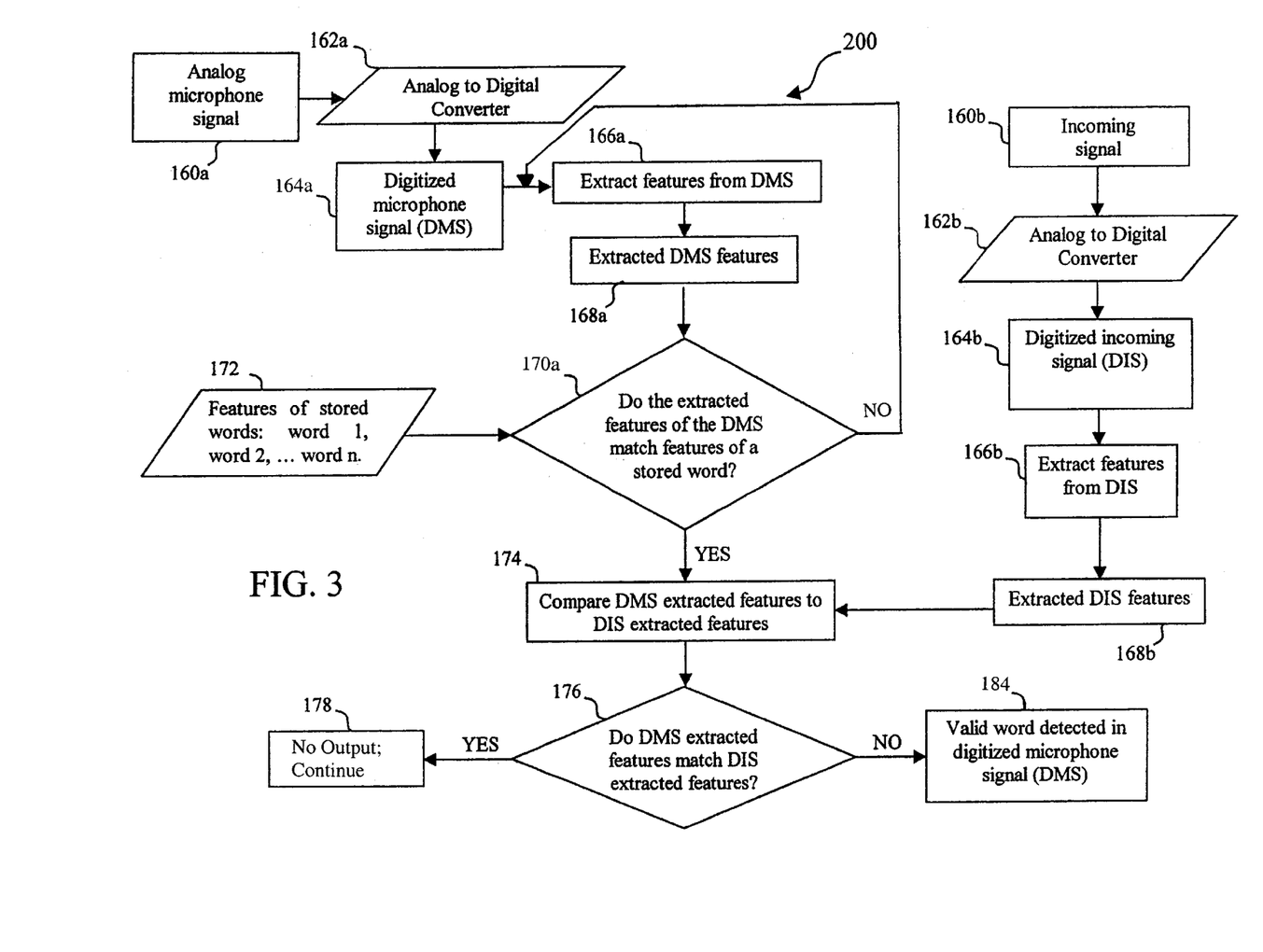
FIG. 3 is a flow chart illustrating one method used by the speech recognition system of FIG. 1.

FIG. 3 shows a flow chart 200 depicts the logic steps involved in speech recognition according to the above described embodiment of the invention in which speech recognition such as illustrated in FIG. 2 is used. Comparable steps to those shown in FIG. 2 are given comparable reference numerals, but with "a" added to steps used with speech recognition unit 120a and "b" added to steps used with speech recognition unit 120b. The outgoing analog microphone signal at 160a on outgoing signal line 54 (see FIG. 1) is converted into a digital signal by an analog to digital (A/D) converter at 162a to produce a digitized microphone signal ("DMS") at 164a and the features of the DMS are extracted at 166a to generate extracted features at 168a. Likewise, the incoming signal at 160b traveling along incoming signal line 52 (see FIG. 1) is converted into a digital signal by an A/D converter at 162b to produce a digitized incoming signal ("DIS") at 164b and the features of the DIS are extracted at 166b to generate extracted features at 168b.

The extracted DMS features from the outgoing signal are compared at 170a with features of known words stored at 172. When the extracted DMS features match the features of one of the stored words 172, the extracted DMS features may be compared at 174 with the extracted DIS features. If it is determined at 176 that the extracted DMS features match the extracted DIS features, then there is no output at 178. If the extracted DMS features and extracted DIS features do not match, a valid word is identified in the DMS and outputted at 184.

It should be recognized, however, that it would be within the scope of the present invention to compare the DMS, DIS and stored words features differently than described above. For example, the extracted features of the DMS and DIS could be compared directly, without comparison to stored words, with there being no output when the extracted features of the DMS and DIS match. In that case, when they do match, the variable system responsive to speech commands could only then compare the extracted features of the DMS with the features of the stored command words. As another example, the DIS extracted features could be first compared to the features of stored words, with comparison with DMS extracted features occurring only when a match is found with the DIS features and features of a stored word. Still other variations will be apparent to a skilled artisan once an understanding of the present invention is obtained.

It should be understood that the speech recognition unit 120b might not detect a word in line 52 (see FIG. 1) at about the same time the speech recognition unit 120a detects a word in line 54 (FIG. 1). In this circumstance, the comparator and signal generator 180 registers a nonmatch at 176 (see FIG. 3) and the word detected in the digitized microphone signal (DMS) is automatically validated and outputted at 184.

Figure 4:
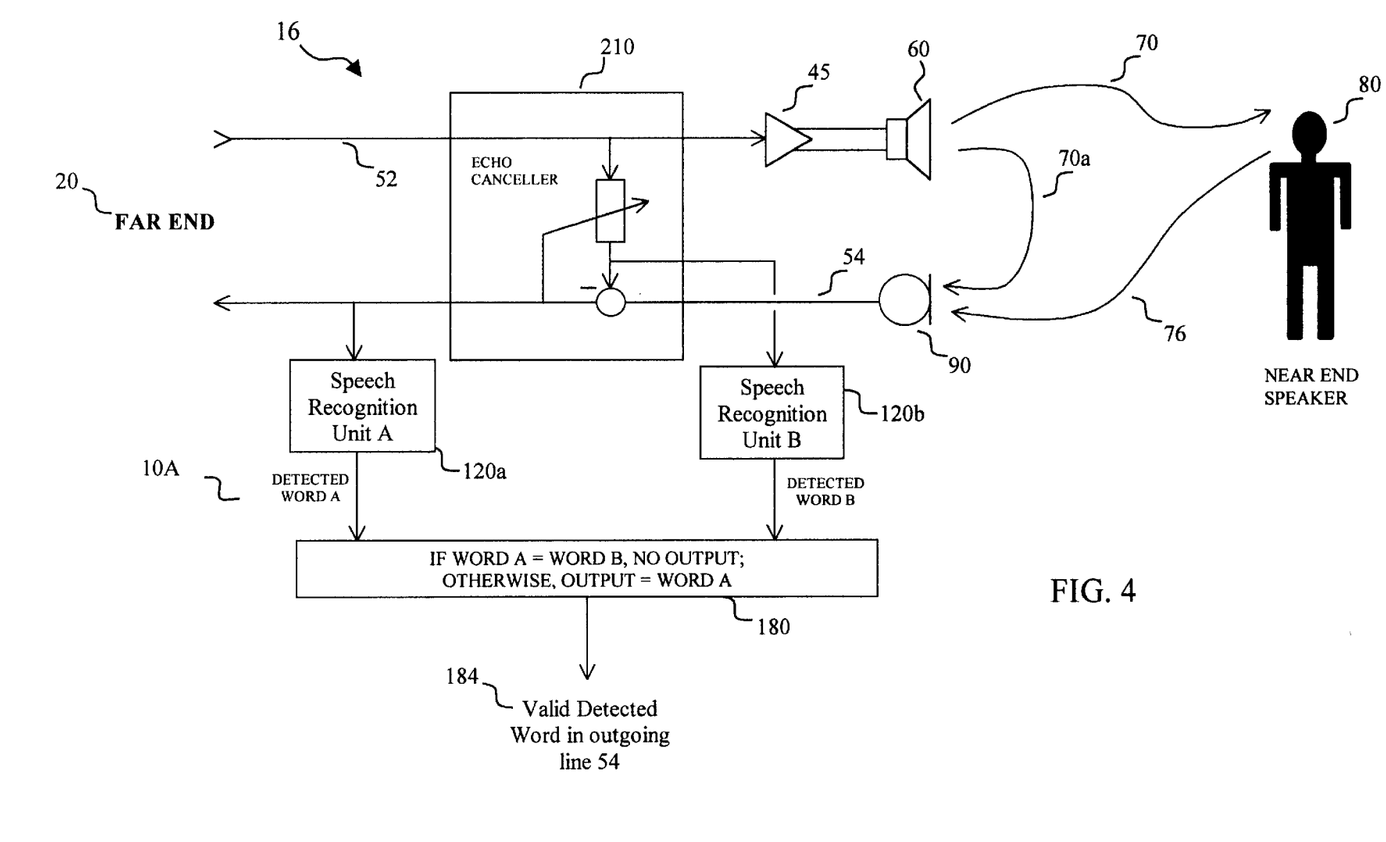
FIG. 4 is a diagram of a speech recognition system in a communication environment according to another aspect of the present invention.

FIG. 4 is a flow chart of a speech recognition system 10A according to another aspect of the present invention, usable with a communication system 16 such as previously described, but including an echo canceller 210 that is operably attached between signal lines 52 and 54. The echo canceller 210 is used to suppress audio sounds 70a from the speaker 60 which are picked up by the microphone 90. The delay of the signal coming from the speaker 60 can be the delay or an extension of the delay required for the linear echo cancellation. Also, the time alignment of words in the audio sounds 70a output by the speaker 60 and when the words occur in the microphone 90 can be narrowed by the peak of the impulse response of the acoustic environment. In accordance with this aspect of the invention, the echo canceller 210 may be trained and its coefficients representative of the impulse of this response. Picking the peak coefficient helps to narrow the delay of the maximum echo path delay from the speaker 60 to the microphone 90.

Figure 5:
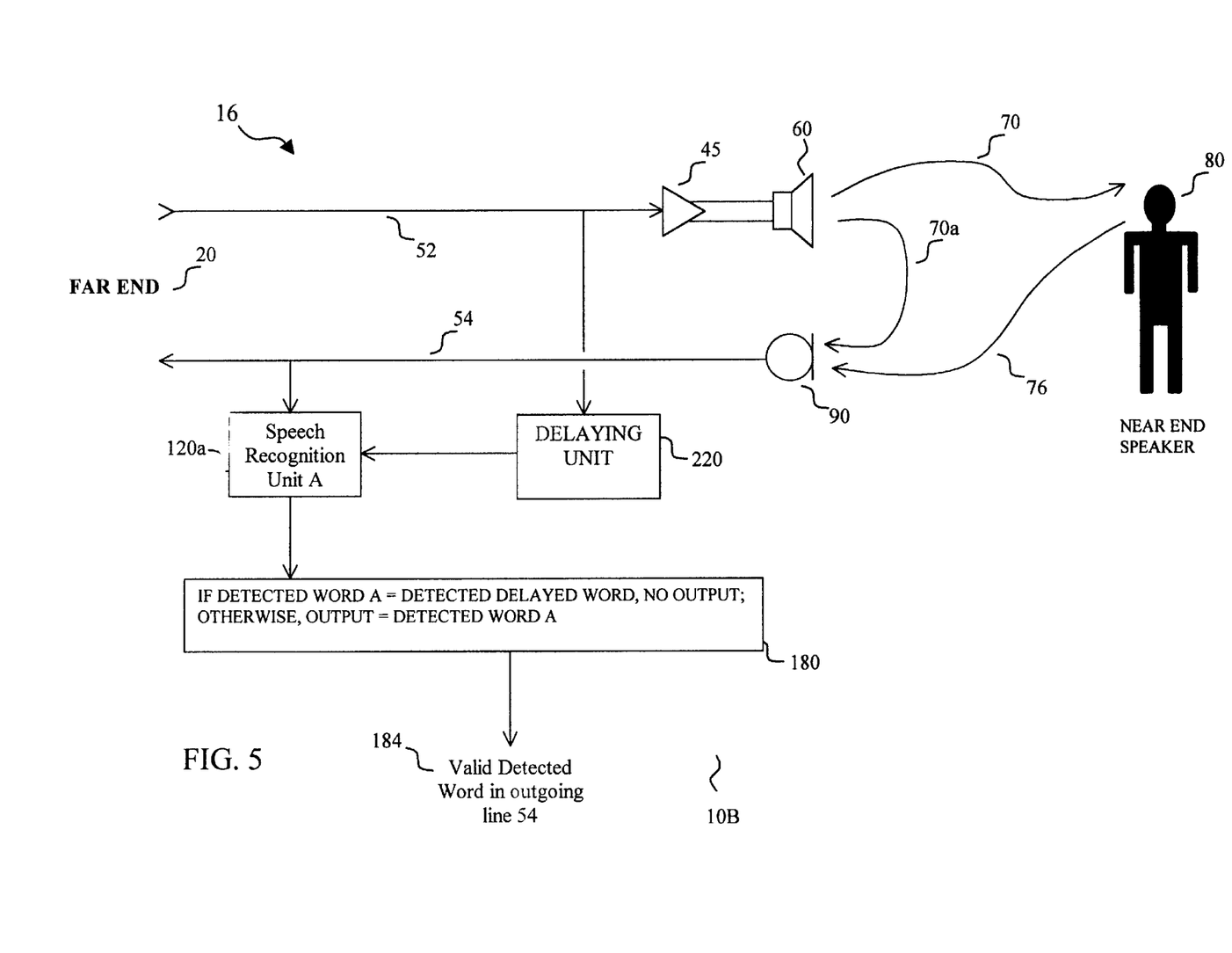
FIG. 5 is a diagram of a speech recognition system incorporating a delaying unit according to another aspect of the present invention.

FIG. 5 is a flow chart of a speech recognition system 10B according to another aspect of the present invention. A delaying unit 220 is operably connected with the incoming signal line 52 and the speech recognition unit A 120a, and serves to delay the loudspeaker signal to provide a delayed loudspeaker signal. In accordance with this aspect of the invention, when the speech recognition unit A (120a) detects a word (represented by "DETECTED WORD A") in the microphone signal from among the stored words which it is looking to recognize, the delayed loudspeaker signal is received from the speech recognition unit A (120a) to determine if the delayed word from the incoming signal line 52 (represented by "DETECTED DELAYED WORD") is the stored word recognized as DETECTED WORD A. That is, when a word is detected in the delayed signal, the comparator and signal generator 180 compares the stored word corresponding DETECTED WORD A from the outgoing microphone signal to the delayed incoming signal. If a match occurs, the comparator and signal generator 180 cancels both words and no signal indicating a word is output at 184. If the delayed incoming signal does not include the stored word corresponding to DETECTED WORD A, the comparator and signal generator 180 generates and outputs at 184 a signal indicating VALID DETECTED WORD A. In this manner, the speech recognition unit A 120a can be used to simply check the incoming signal for just the detected word rather than requiring it to compare the incoming signal to the speech recognition unit's 120a entire dictionary of stored words. It should be recognized, of course, that alternatively a separate speech recognition unit could be used with the delayed incoming signal where the speech recognition unit which searches the outgoing signal provides the separate speech recognition unit with information regarding the detected word to search for, with a word output at 184 when the separate speech recognition unit does not find that word.

It should also be understood that the delaying unit 220 might provide either an analog or digital form of delayed signal. For example, a delaying unit 220 having an A/D converter may be provided to convert an incoming analog signal from line 52 to a digitized delayed signal, with the delay being PCM samples from the A/D converter or the extracted features used in the speech recognition process. PCM samples may typically consist of 8 or 16 bits per sample at an 8 k rate which requires the delaying unit 220 to save data at 64 k or 128 k bits per second. Using the extracted features used in the speech recognition process reduces the amount of memory required to perform the delay.

In accordance with another aspect of the present invention, the speech recognition unit(s) may be separately trained to detect selected command words from different sources. For example, the speech recognition unit may be trained to create a template of features of selected command words as they would be received from a variable system. In that case, the template could be initially generated by automatically capturing words from the incoming signal line 52, or by locally training the speech recognition unit at the near end 24 by capturing words carried in the outgoing signal on the outgoing signal line 54 responsive to the microphone 90 picking up the audio sound 70a from the speaker 60. The speech recognition unit may also be trained to recognize those same words as spoken by the user 80 at the near end 24, or be capable of recognizing speaker independent vocabulary. Two separate templates of the same words, one as "spoken" in the incoming signal and the other as spoken by the user 80 (but pronounced differently) would be used in parallel. In such a case, recognition of a command word from the incoming signal templates would be ignored, with output provided only when the recognition is of a word on the template of words as spoken by the user 80. Of course, the operator of the variable system could provide special or unusual inflections or other audio characteristics to the command words which it sends on the incoming signal line 52 to make differentiation of the words on the different templates easier.

Alternatively, in some systems the "incoming signal" which is played out of the speaker 60 is generated locally (i.e., the far end 20 of the incoming signal line 52 for some of the audio sounds 70 and 70a may actually be physically adjacent the near end 24), so that the speech recognition echo canceller knows what words are said and when they are said. With such systems, in accordance with another aspect of the present invention, the command words being output from the speaker 60 may be signaled to the speech recognition unit and then canceled from the outgoing signal by ignoring their detection at the time of use (i.e., during the time window when the command word is being played out of the speaker 60) or by removing the word from the words being searched for by the speech recognition unit during that time window.

While the invention is described above in connection with preferred or illustrative embodiments, these embodiments are not intended to be exhaustive or limiting of the invention. Rather, the invention is intended to cover all alternatives, modifications and equivalents included within the scope of the invention, as defined by the appended claims.

I claim:

1. A voice recognition system for use with a communication system having an incoming line and an outgoing line, said incoming line carrying an incoming signal from a first end to a second end operably attached to an audio output responsive to said incoming signal and said outgoing line carrying an outgoing signal from a second end to a first end, said outgoing line second end being attached to a microphone near said audio output, said voice recognition system comprising:

a first speech recognition unit for detecting an incoming word in said incoming signal;

a second speech recognition unit for detecting an outgoing word in said outgoing signal;

a comparator operably connected to said first and second speech recognition units, said comparator comparing said outgoing word with said incoming word and outputting said outgoing word when said outgoing word does not match said incoming word.

2. The voice recognition system of claim 1, further comprising a delay in said first speech recognition unit, wherein said first speech recognition unit detects only said incoming word corresponding to said outgoing word detected by said second speech recognition unit.

3. The voice recognition system of claim 1, further comprising an echo canceller between said first speech recognition unit and said incoming line.

4. The voice recognition system of claim 1, wherein said first speech recognition unit is remote from said incoming line first end and said second speech recognition unit is remote from said outgoing line first end.

5. A voice recognition system for use with a communication system having an incoming line and an outgoing line, said incoming line carrying an incoming signal from a first end to a second end operably attached to an audio output responsive to said incoming signal and said outgoing line carrying an outgoing signal from a second end to a first end, said outgoing line second end being attached to a microphone adjacent to said audio output and said outgoing line first end being attached to a variable system responsive to a selected command word in said outgoing signal, said voice recognition system comprising:

a first speech recognition unit for detecting a selected outgoing word corresponding to said selected command word in said outgoing signal;

a second speech recognition unit delayed relative to said first speech recognition unit for searching for an incoming word in said incoming signal corresponding to said selected outgoing word detected by said first speech recognition unit during said delay; and a signal generator operably connected to said second speech recognition unit, said signal generator generating a command corresponding to said selected command word when said incoming word corresponding to said selected outgoing word is not detected by said second speech recognition unit.

6. The voice recognition system of claim 5, wherein said delay in said second speech recognition unit is a digital delay from extracted features of speech recognition.

7. The voice recognition system of claim 5, wherein said first speech recognition unit is remote from said incoming line first end and said second speech recognition unit is remote from said outgoing line first end.

8. A voice recognition system for use with a communication system having an incoming line and an outgoing line, said incoming line carrying an incoming signal from a first end to a second end operably attached to an audio output responsive to said incoming signal and said outgoing line carrying an outgoing signal from a second end to a first end, said outgoing line second end being attached to a microphone adjacent to said audio output and said outgoing line first end being attached to a variable system responsive to selected command words in said outgoing signal, said voice recognition system comprising:

a first speech recognition unit with a first template of selected words corresponding to said selected command words in said incoming signal;

a second speech recognition unit with a second template trained to detect selected outgoing words corresponding to said selected command words in said outgoing signal, said selected outgoing words being words spoken by a user of said voice recognition system;

a signal generator operably connected to said first and said second speech recognition units, said signal generator generating commands to said variable system responsive only to said selected outgoing words.

9. The voice recognition system of claim 8, wherein said first speech recognition unit checks only words detected by said second speech recognition unit as being in said second template, said signal generator generating commands to said variable system responsive only to said selected outgoing command words which are both detected in said first template and not detected in said second template.

10. The voice recognition system of claim 8, wherein said second template detects speaker dependent selected command words.

11. The voice recognition system of claim 8, wherein said second template includes speaker independent selected command words, and said second speech recognition unit is trainable to replace said speaker independent selected command words in said second template with corresponding detected speaker dependent words.

12. The voice recognition system of claim 8, further comprising a first memory storing a first template of said selected incoming words detected by said first speech recognition unit and a second memory storing a second template of said selected outgoing words.

13. The voice recognition system of claim 8, wherein said variable system further generates voice prompts, and said first speech recognition unit is trained to recognize voice prompts of said variable system.

14. The voice recognition system of claim 13, wherein said first speech recognition unit checks only words detected by said second speech recognition unit as being in said second template, said signal generator generating commands to said variable system responsive only to said selected outgoing command words which are both detected in said first template and not detected in said second template.

15. The voice recognition system of claim 8, wherein variable system is a speech responsive system.

16. The voice recognition system of claim 8, wherein said first speech recognition unit stores said command words in said incoming signal and detects said selected incoming words by comparing said incoming signal with said stored command words.

17. The voice recognition system of claim 8, wherein said first speech recognition unit is remote from said incoming line first end and said second speech recognition unit is remote from said outgoing line first end.

18. A voice recognition system for use with a communication system having an incoming line and an outgoing line, said incoming line carrying an incoming signal from a first end to a second end operably attached to an audio output responsive to said incoming signal and said outgoing line carrying an outgoing signal from a second end to a first end, said outgoing line second end being attached to a microphone adjacent to said audio output and said outgoing line first end being attached to a variable system responsive to selected command words in said outgoing signal, said voice recognition system comprising:

a first speech recognition unit for detecting said selected command words in said incoming signal;

a second speech recognition unit for detecting said selected command words in said outgoing signal;

a signal generator operably connected to said first and said second speech recognition units, said signal generator generating commands for said variable system responsive to detection of one of said selected command words by said second speech recognition unit when said one selected command word is not detected by said first speech recognition unit during a selected time period prior to detection of said one selected command word by said second speech recognition unit.

19. The voice recognition system of claim 18, wherein said selected command words detected by said second speech recognition unit include all of said selected command words except said selected command words detected by said first speech recognition unit during said selected time period.

20. The voice recognition system of claim 18, wherein said signal generator ignores selected command words detected by said second speech recognition unit corresponding to selected command words detected by said first speech recognition unit during said selected time period.

21. The voice recognition system of claim 18, wherein said command generated by said signal generator is a signal capable of voice recognition by a remote speech recognition unit associated with said variable system.

22. The voice recognition system of claim 18, wherein said first speech recognition unit is remote from said incoming line first end and said second speech recognition unit is remote from said outgoing line first end.

23. A method for speech recognition in a communication environment where both directions of said communication system are active at the same time, said method comprising:

applying speech recognition to an incoming signal to detect an incoming word;

applying speech recognition to an outgoing signal to detect an outgoing word;

outputting a command signal associated with a detected selected outgoing word which does not match said incoming word; and wherein said applying speech recognition to said incoming and outgoing signals results in the detection of a null word in the incoming signal and an outgoing word in the outgoing signal resulting in the output of said outgoing word.

24. The method according to claim 23, further comprising applying echo canceling to said outgoing signal to reduce the relative signal strength of said incoming signal in said outgoing signal.

25. The method according to claim 23, further comprising comparing said detected outgoing word to said detected incoming word; and said outputting said command signal associated with said detected selected outgoing word occurs when said detected outgoing word does not match said detected incoming word.

26. A method for speech recognition in a communication environment where both directions of said communication system are active at the same time, said communication system having a near end and a far end, an incoming line carrying an incoming signal from the far end to the near end of said communication system, an outgoing line carrying an outgoing signal from the near end to the far end of said communication system, a speaker operably attached to the far end of said incoming line for audio output of said incoming signal, a microphone operably attached to the near end of said outgoing line for picking up sound for inclusion in said outgoing signal, said method comprising:

applying speech recognition to said incoming signal in said incoming line to detect an incoming word;

applying speech recognition to said outgoing signal in said outgoing line to detect an outgoing word;

comparing said outgoing word to said incoming word; and outputting a valid word when the outgoing word does not match the incoming word.

27. The method claim 26, wherein said applying speech recognition to said incoming audio signal further comprises converting said incoming signal to a digitized incoming signal and extracting features from said digitized incoming signal to provide extracted digitized incoming signal features.

28. The method claim 27, wherein said applying speech recognition to said outgoing audio signal further comprises converting said outgoing signal to a digitized outgoing signal and extracting features from said digitized outgoing signal to provide extracted digitized outgoing signal features.

29. The method claim 28, wherein said comparing said outgoing word to said incoming word further comprises comparing said extracted digitized outgoing signal features with said extracted digitized incoming signal features.

* * * * *

UNITED STATES PATENT AND TRADEMARK OFFICE
CERTIFICATE OF CORRECTION

PATENT NO. : 6,725,193 B1  
DATED : April 20, 2004  
INVENTOR(S) : Thomas J. Makovicka It is certified that error appears in the above-identified patent and that said Letters Patent is hereby corrected as shown below:

<u>Title page,</u>
Item [73], Assignee, "Telefonaktiebolaget LM Ericsson (SE)" should be
-- Ericsson Inc. --

Signed and Sealed this

Twenty-ninth Day of June, 2004

JON W. DUDAS  
*Acting Director of the United States Patent and Trademark Office*